US011445854B1

(12) United States Patent
Gresham, II

(10) Patent No.: US 11,445,854 B1
(45) Date of Patent: Sep. 20, 2022

(54) ROTATING CHARCOAL GRILL

(71) Applicant: Willie Gresham, II, Marietta, GA (US)

(72) Inventor: Willie Gresham, II, Marietta, GA (US)

(*) Notice: Subject to any disclaimer, the term of this patent is extended or adjusted under 35 U.S.C. 154(b) by 467 days.

(21) Appl. No.: 16/538,922

(22) Filed: Aug. 13, 2019

(51) Int. Cl.
*A47J 37/04* (2006.01)
*A47J 37/07* (2006.01)

(52) U.S. Cl.
CPC ......... *A47J 37/043* (2013.01); *A47J 37/0745* (2013.01); *A47J 37/0786* (2013.01); *A47J 2037/0795* (2013.01)

(58) Field of Classification Search
CPC .. A47J 37/043; A47J 37/0745; A47J 37/0786; A47J 2037/0795
See application file for complete search history.

(56) References Cited

U.S. PATENT DOCUMENTS

| 2,748,261 | A | * | 5/1956 | Wolar | F21V 21/22 |
| | | | | | 362/413 |
| 3,258,001 | A | | 6/1966 | Virgil | |
| 3,298,301 | A | * | 1/1967 | Lowndes | A47J 37/0745 |
| | | | | | 99/340 |
| 3,469,870 | A | * | 9/1969 | Barkus | F16B 7/105 |
| | | | | | 403/107 |
| 3,657,996 | A | | 4/1972 | Thompson | |
| 4,805,587 | A | | 2/1989 | Schweitzer | |
| 6,508,167 | B1 | * | 1/2003 | Lu | A47J 37/0745 |
| | | | | | 99/419 |
| D473,746 | S | | 4/2003 | Yeh | |
| 6,929,001 | B2 | * | 8/2005 | Yoon | A47J 37/0704 |
| | | | | | 126/25 AA |
| 9,131,802 | B2 | | 9/2015 | Aceves | |
| 2004/0154603 | A1 | * | 8/2004 | Crawford | A47J 37/079 |
| | | | | | 126/25 R |
| 2008/0264403 | A1 | | 10/2008 | Kurt | |
| 2012/0216687 | A1 | * | 8/2012 | Trovinger | A47J 19/025 |
| | | | | | 99/510 |
| 2013/0192474 | A1 | * | 8/2013 | Rodriguez Aceves | |
| | | | | | A47J 37/0786 |
| | | | | | 99/443 R |
| 2015/0297028 | A1 | * | 10/2015 | Kazerouni | A47J 37/0786 |
| | | | | | 126/25 AA |
| 2016/0360925 | A1 | | 12/2016 | Chun | |

FOREIGN PATENT DOCUMENTS

| AT | 15072 U1 | * | 12/2016 | ......... A47J 37/0731 |
| GB | 2527568 A | * | 12/2015 | ......... A47J 37/0745 |
| WO | WO-2013005117 A1 | * | 1/2013 | ......... A47J 37/0731 |

* cited by examiner

*Primary Examiner* — Jorge A Pereiro
*Assistant Examiner* — Logan P Jones
(74) *Attorney, Agent, or Firm* — Kyle A. Fletcher, Esq.

(57) ABSTRACT

The rotating charcoal grill comprises a base, a charcoal bowl, a cooking grate, a support shaft, a grate coupler, and a spring. The rotating charcoal grill may be a grill for cooking food over charcoal. The support shaft may support the charcoal bowl at a first height above the base. A motor located in the base may cause a motor shaft to rotate. A height adjustment pin on the motor shaft may cause rotation of the support shaft and the charcoal bowl when the motor shaft rotates. The motor shaft may support the cooking grate at a second height above the base. The difference between the first height and the second height may be adjustable such that the cooking grate may be brought closer to or farther away from the charcoal bowl.

16 Claims, 5 Drawing Sheets

ROTATING CHARCOAL GRILL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of barbecue grills, more specifically, a rotating charcoal grill.

SUMMARY OF INVENTION

The rotating charcoal grill comprises a base, a charcoal bowl, a cooking grate, a support shaft, a grate coupler, and a spring. The rotating charcoal grill may be a grill for cooking food over charcoal. The support shaft may support the charcoal bowl at a first height above the base. A motor located in the base may cause a motor shaft to rotate. A height adjustment pin on the motor shaft may cause rotation of the support shaft and the charcoal bowl when the motor shaft rotates. The motor shaft may support the cooking grate at a second height above the base. The difference between the first height and the second height may be adjustable such that the cooking grate may be brought closer to or farther away from the charcoal bowl.

An object of the invention is to cook food on a cooking grate located above a charcoal bowl.

Another object of the invention is to rotate the charcoal bowl independently of the cooking grate to assure more equal heating of the food on the cooking grate.

A further object of the invention is to provide an adjustment for changing the separation distance between the cooking grate and the charcoal bowl.

Yet another object of the invention is to provide a battery-driven motor for rotating the charcoal bowl.

These together with additional objects, features and advantages of the rotating charcoal grill will be readily apparent to those of ordinary skill in the art upon reading the following detailed description of the presently preferred, but nonetheless illustrative, embodiments when taken in conjunction with the accompanying drawings.

In this respect, before explaining the current embodiments of the rotating charcoal grill in detail, it is to be understood that the rotating charcoal grill is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the rotating charcoal grill.

It is therefore important that the claims be regarded as including such equivalent construction insofar as they do not depart from the spirit and scope of the rotating charcoal grill.

It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
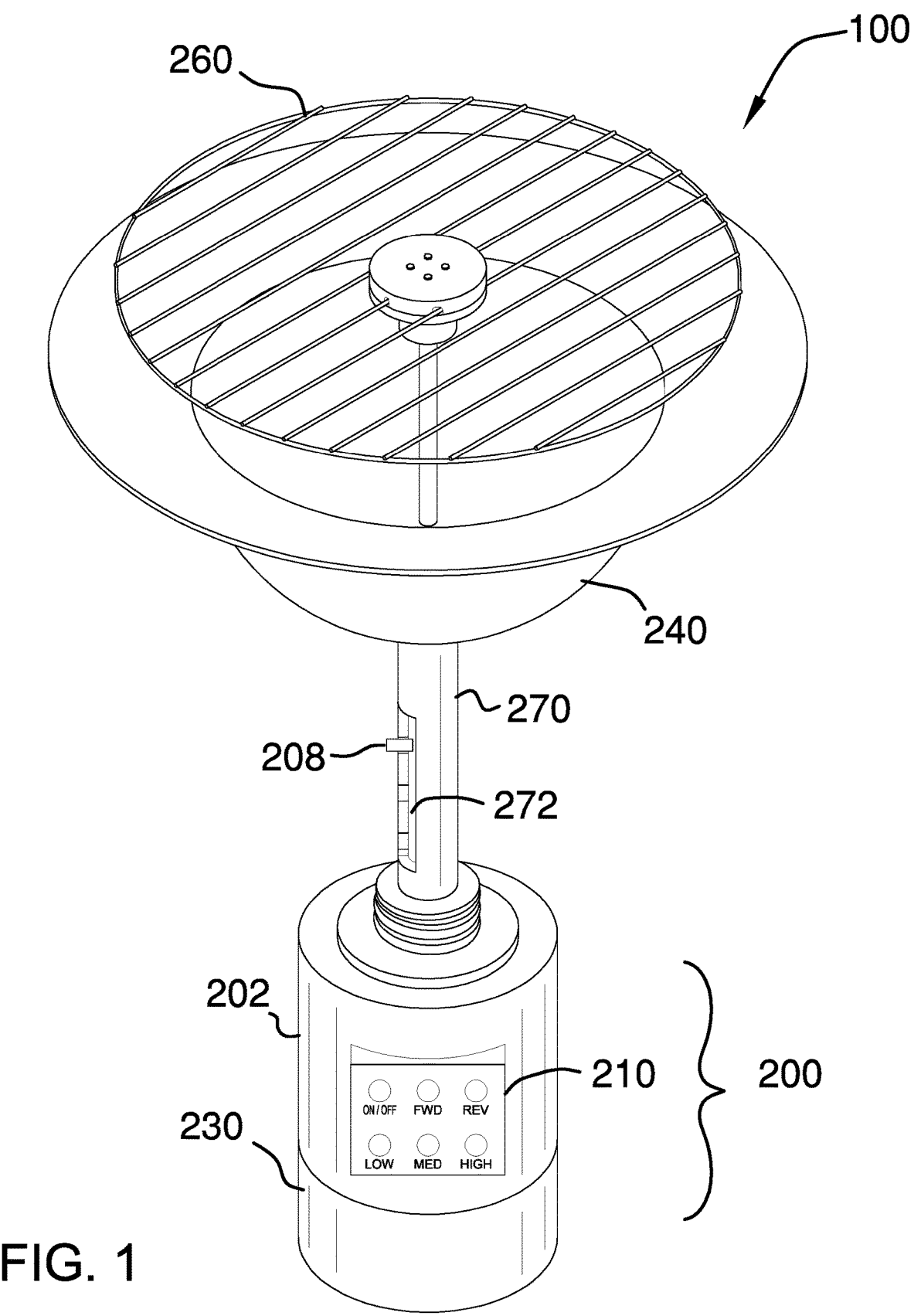
FIG. 1 is a perspective view of an embodiment of the disclosure.
Figure 2:
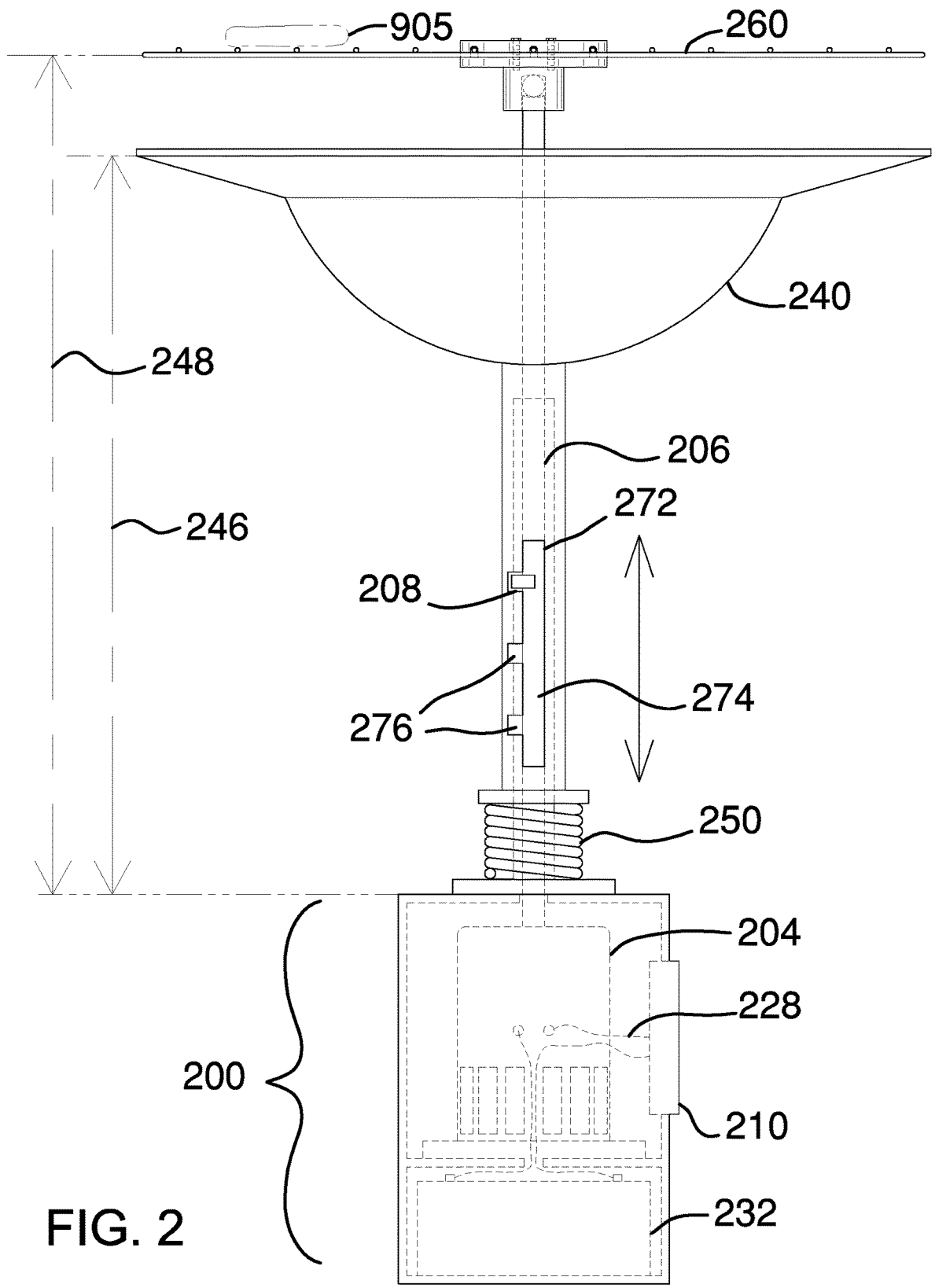
FIG. 2 is a front view of an embodiment of the disclosure.
Figure 3:
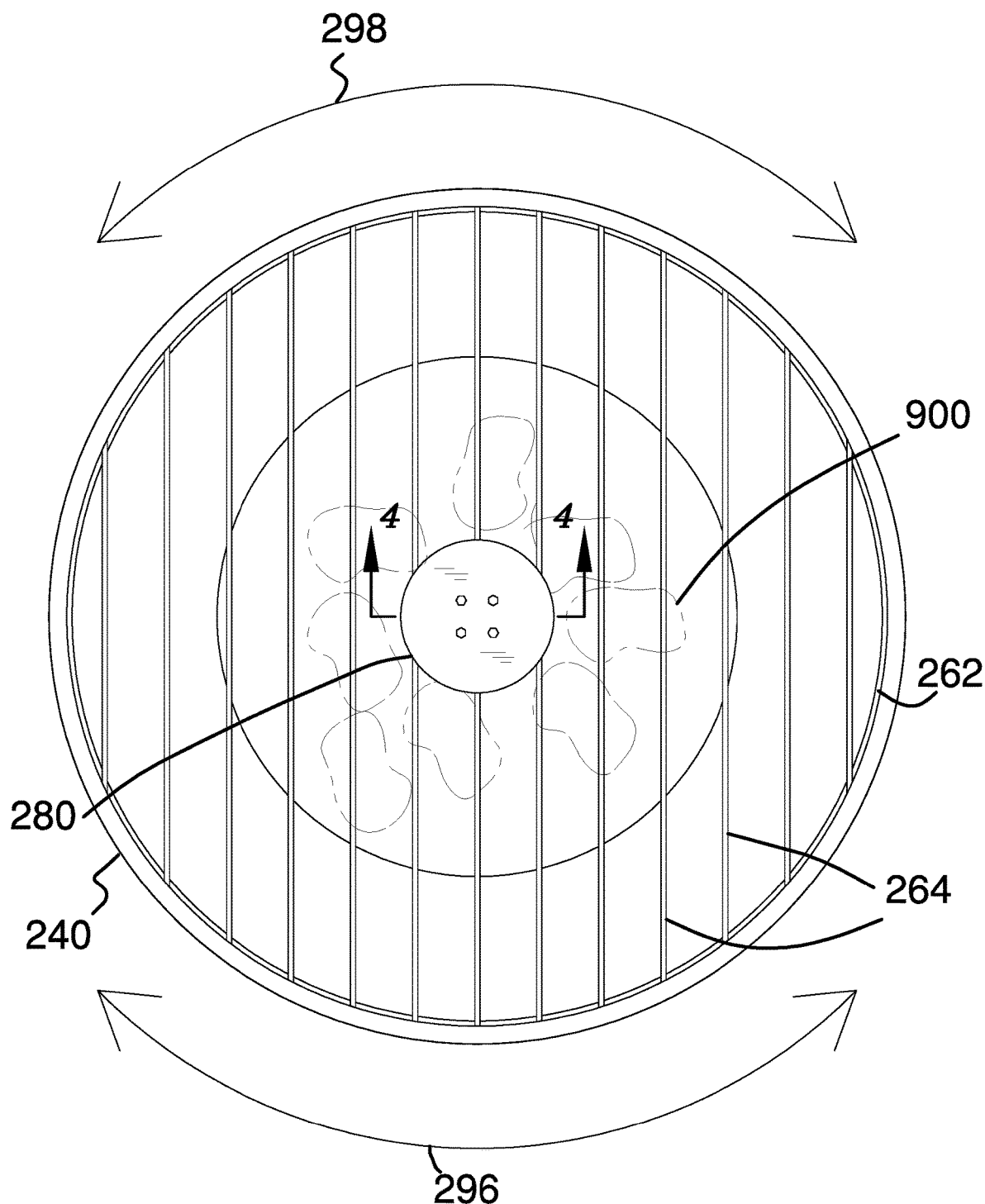
FIG. 3 is the top view of an embodiment of the disclosure.
Figure 4:
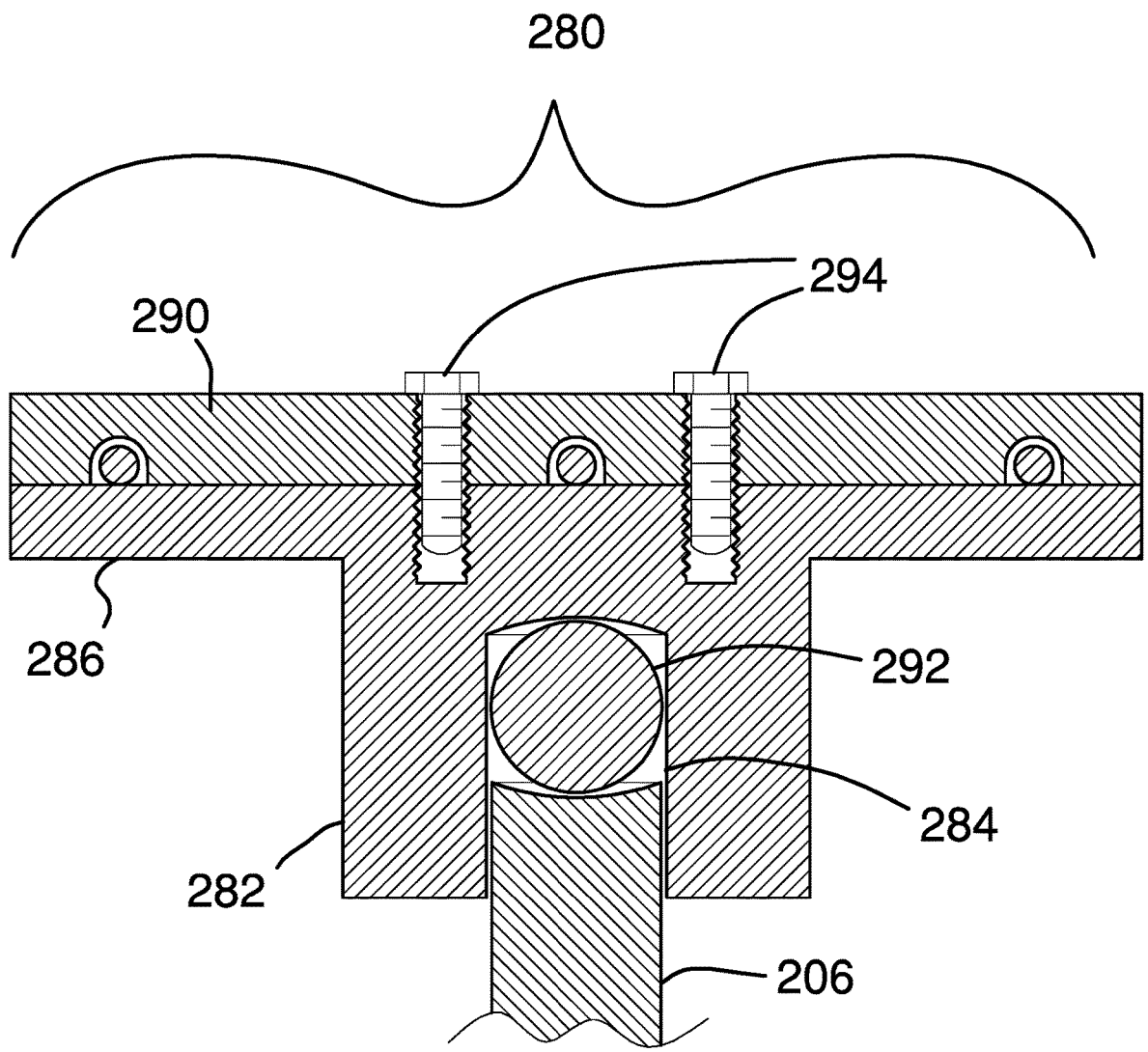
FIG. 4 is a cross-sectional view of an embodiment of the disclosure across 4-4 as shown in FIG. 3.
Figure 5:
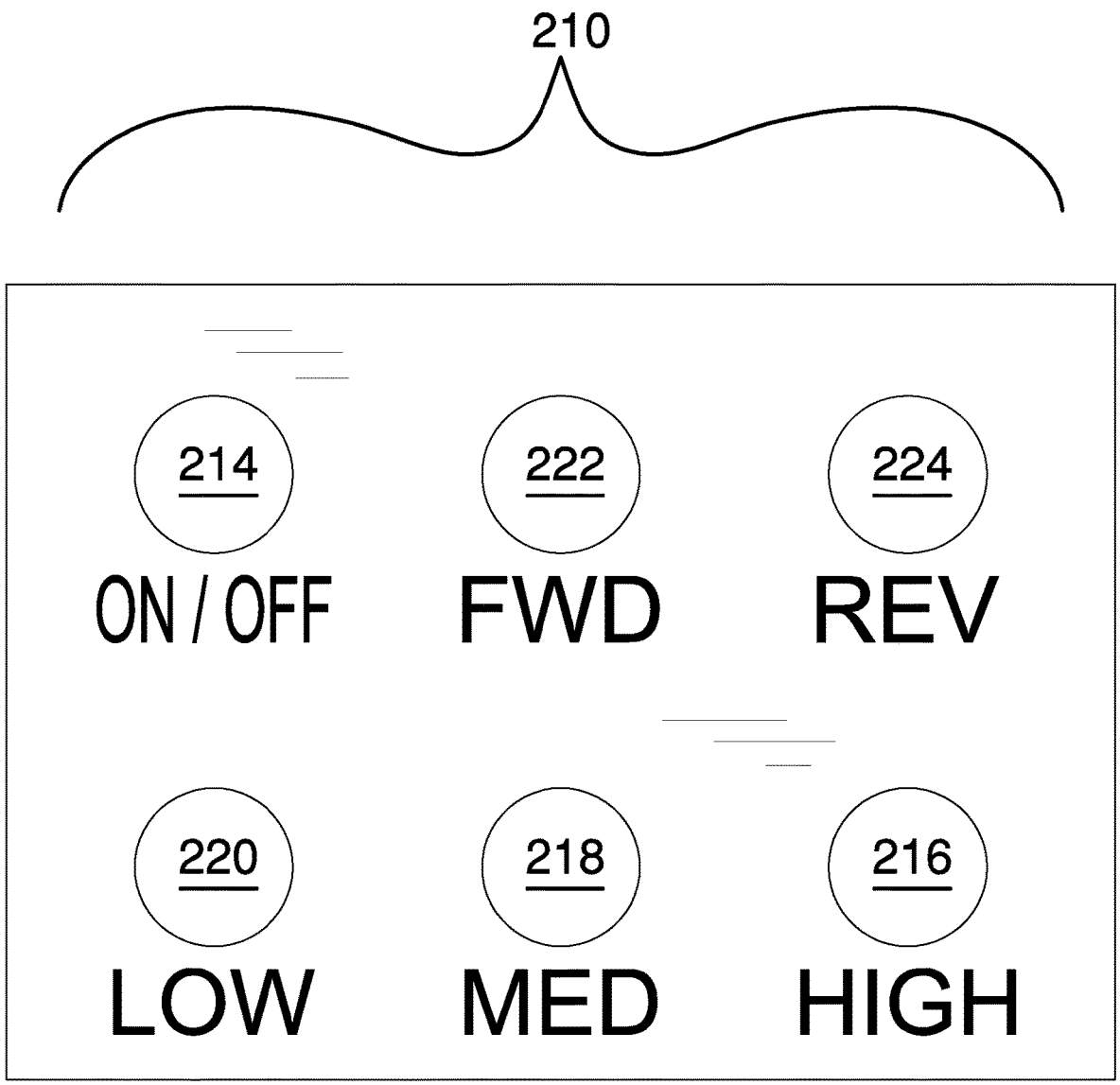
FIG. 5 is a detail view of an embodiment of the disclosure illustrating the operator panel.

Detailed reference will now be made to a first potential embodiment of the disclosure, which is illustrated in FIGS. 1 through 5.

The rotating charcoal grill 100 (hereinafter invention) comprises a base 200, a charcoal bowl 240, a cooking grate 260, a support shaft 270, a grate coupler 280, and a spring 250. The invention 100 may be a grill for cooking food 905 over charcoal 900. The support shaft 270 may support the charcoal bowl 240 at a first height 246 above the base 200. A motor 204 located in the base 200 may cause a motor shaft 206 to rotate. A height adjustment pin 208 on the motor shaft 206 may cause rotation of the support shaft 270 and the charcoal bowl 240 when the motor shaft 206 rotates. The motor shaft 206 may support the cooking grate 260 at a second height 248 above the base 200 where the second height 248 is larger than the first height 246. The grate coupler 280 may rotationally couple the cooking grate 260 to the top of the motor shaft 206 such that the cooking grate 260 is free to rotate atop the motor shaft 206. The difference between the first height 246 and the second height 248 may be adjustable such that the cooking grate 260 may be brought closer to or farther away from the charcoal bowl 240.

The bottom of the base 200 may be placed upon a horizontal surface to support the invention 100. The base 200 may comprise a battery housing 230 and a motor housing 202. The battery housing 230 may cover one or more batteries 232 and wiring 228. The one or more batteries 232 may comprise one or more energy-storage devices. The one or more batteries 232 may be a source of electrical energy to operate the motor 204. The one or more batteries 232 may be replaceable or rechargeable.

The motor housing 202 may cover the motor 204 and the wiring 228. The motor 204 may convert electrical energy into mechanical energy. The motor 204 may cause movement of the motor shaft 206 when electrical energy is applied to the motor 204. The electrical energy applied to the motor 204 may be controlled by an operator panel 210. The motor shaft 206 may extend vertically upward from the motor 204 and through the top of the base 200.

The motor shaft 206 may comprise the height adjustment pin 208. The height adjustment pin 208 may be a horizontal protrusion of the motor shaft 206 that is located at a midpoint of the motor shaft 206. The height adjustment pin 208 may engage with a height adjustment cutout 272 in order to set the first height 246.

The operator panel 210 may control the operation of the motor 204. The operator panel 210 may comprise plurality of controls. As a non-limiting example, the plurality of controls may comprise an on/off control 214.

The on/off control 214 may apply or remove an electrical potential to the motor 204. The motor 204 may be energized when the on/off control 214 is in an ON position and may be de-energized when the on/off control 214 is in an OFF position.

The plurality of controls may comprise one or more speed controls. The one or more speed controls may determine the voltage applied to the motor 204, amperage through the motor 204, or combinations thereof and may thereby determine the rotational speed of the motor shaft 206. As non-limiting examples, the plurality of controls may comprise a high speed control 216, a medium speed control 218, and a low speed control 220. When the high speed control 216 is activated, the motor shaft 206 may rotate at the maximum possible speed of rotation. When the low speed control 220 is activated, the motor shaft 206 may rotate at the minimum possible speed of rotation. When the medium speed control 218 is activated, the motor shaft 206 may rotate at a speed that is intermediate between the rotational speeds that are associated with the high speed control 216 and the low speed control 220.

The charcoal bowl 240 may be a container for the charcoal 900. The shape of the charcoal bowl 240 may be hemispherical. The top of the charcoal bowl 240 may be open to accept the charcoal 900. The bottom of the charcoal bowl 240 may be coupled to the top of the support shaft 270. The motor shaft 206 may pass through the bottom center of the charcoal bowl 240 in order to reach the grate coupler 280.

The cooking grate 260 may be a grill that holds the food 905 above the charcoal 900. The cooking grate 260 may comprise a circular rim 262 and a plurality of transverse rods 264. The plurality of transverse rods 264 may be parallel to each other. The ends of the plurality of transverse rods 264 may be coupled to the circular rim 262 where the ends of the plurality of transverse rods 264 intersect the circular rim 262.

The support shaft 270 may be a vertically-oriented hollow cylinder that elevates the charcoal bowl 240. The bottom of the support shaft 270 may rest upon the spring 250. The motor shaft 206 may pass vertically through the center of the support shaft 270. The support shaft 270 may comprise the height adjustment cutout 272. The height adjustment cutout 272 may engage with the height adjustment pin 208 to establish the first height 246. The height adjustment cutout 272 may comprise a vertical slot 274 and two or more adjustment notches 276. The vertical slot 274 may be a vertically-oriented aperture located on the side of the support shaft 270. The two or more adjustment notches 276 may be horizontally-oriented extensions of the vertical slot 274. The height of the charcoal bowl 240 may be changed by moving the support shaft 270 vertically while the height adjustment pin 208 is within the vertical slot 274. The height of the charcoal bowl 240 may be fixed by rotating the support shaft 270 such that the height adjustment pin 208 engages with one of the two or more adjustment notches 276.

The grate coupler 280 may couple the cooking grate 260 to the motor shaft 206 such that the cooking grate 260 may be supported by the motor shaft 206 while the cooking grate 260 is free to rotate around the center of the cooking grate 260. The grate coupler 280 may comprise a bearing housing 282, a ball bearing 292, and a grate cover 290.

The bearing housing 282 may be an inverted flange that rides on the motor shaft 206 and supports the cooking grate 260. Specifically, a throat 284 of the bearing housing 282 may cover the top of the motor shaft 206 and the ball bearing 292. The bearing housing 282 may rotate within a horizontal plane around the motor shaft 206. The ball bearing 292 may reduce friction between the motor shaft 206 and the bearing housing 282. The plurality of transverse rods 264 of the cooking grate 260 may be sandwiched between a lip 286 of the bearing housing 282 and the grate cover 290. A plurality of fasteners 294 may retain the grate cover 290 to the bearing housing 282. As non-limiting examples, the plurality of fasteners 294 may be bolts or screws.

The spring 250 may be a coil spring that surrounds the motor shaft 206. The bottom of the spring 250 may rest upon and press against the top of the base 200. The top of the spring 250 may press against the bottom of the support shaft 270. Absent restraint due to the height adjustment pin 208 engaging with one of the two or more adjustment notches 276, the spring 250 may force the support shaft 270 upwards. The charcoal bowl 240 may be raised or lowered by rotating the support shaft 270 until the height adjustment pin 208 aligns with the vertical slot 274, lifting or pushing down upon the support shaft 270, and rotating the support shaft 270 to engage the height adjustment pin 208 with one of the two or more adjustment notches 276. The spring 250 may assist in raising the charcoal bowl 240 by pushing up on the support shaft 270.

In some embodiments, the plurality of controls may comprise a forward control 222 and a reverse control 224. The forward control 222 may cause the motor shaft 206 to rotate in a first direction 296 when the motor 204 is energized. The reverse control 224 may cause the motor shaft 206 to rotate in a second direction 298 when the motor 204 is energized.

In use, the charcoal 900 may be placed into the charcoal bowl 240 and lit. The food 905 may be placed upon the cooking grate 260. The on/off control 214 may be activated to energizer the motor 204, causing the motor shaft 206 to rotate. As the motor shaft 206 rotates, the height adjustment pin 208, which may be engaged in one of the two or more adjustment notches 276 on the support shaft 270, may cause the support shaft 270 to rotate. Rotation of the support shaft 270 may cause the charcoal bowl 240 to rotate, thus passing hotter and cooler areas of the charcoal 900 under the food 905. The separation distance between the cooking grate 260 and the top of the charcoal bowl 240 may be changed by rotating the support shaft 270 until the height adjustment pin 208 aligns with the vertical slot 274, lifting or pushing down upon the support shaft 270, and rotating the support shaft 270 to engage the height adjustment pin 208 with one of the two or more adjustment notches 276. The speed of rotation may be changed by activating the high speed control 216, the medium speed control 218, or the low speed control 220 on the operator panel 210. In some embodiments, the direction of rotation may be changed by activating the forward control 222 or the reverse control 224 on the operator panel 210.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "aperture" is an opening in a surface. Aperture may be synonymous with hole, slit, crack, gap, slot, or opening.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used in this disclosure, a "cylinder" is a geometric structure defined by two identical flat and parallel ends, also commonly referred to as bases, which are circular in shape and connected with a single curved surface which may be referred to as the face. The axis of the cylinder is formed by the straight line that connects the center of each of the two identical flat and parallel ends of the cylinder. Unless otherwise stated within this disclosure, the term cylinder specifically indicates a right cylinder which is defined as a cylinder wherein the curved surface perpendicularly intersects with the two identical flat and parallel ends.

As used in this disclosure, a "flange" is a protruding rib, edge, or collar that is used to hold an object in place or to attach a first object to a second object.

As used in this disclosure, a "grate" is a plurality of parallel metal bars or a metal structure comprising a mesh structure formed from metal bars.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, a "housing" is a rigid casing that encloses and protects one or more devices.

As used in this disclosure, the term "intermediate" refers to a location that lies between a first object and a second object As used herein, the words "invert", "inverted", or "inversion" refer to an object that has been turned inside out or upside down or to the act of turning an object inside out or upside down.

As used here, the word "midpoint" refers to a point near the center of an object. An "exact midpoint" refers to a midpoint that is equidistant from edges of the object in at least one direction. Unless otherwise stated, a midpoint is not required to be at the exact center of the object but instead may be within 50% of the distance from the exact midpoint to the farthest edge or farthest corner.

As used in this disclosure, a "motor" refers to a device that transforms energy from an external power source into mechanical energy.

As used in this disclosure, a "rim" is an outer edge or border that follows along the perimeter of an object.

As used in this disclosure, the term "shaft" is used to describe a rigid cylinder. A shaft is often used as the handle of a tool or implement or as the center of rotating machinery or motors. The definition of shaft explicitly includes solid shafts or shafts that comprise a hollow passage through the shaft along the center axis of the shaft cylinder, whether the shaft has one or more sealed ends or not.

As used in this disclosure, a "slot" is a long narrow groove, cut, opening, or aperture that is formed in or through an object.

As used in this disclosure, a "spring" is a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used in this disclosure, "vertical" refers to a direction that is parallel to the local force of gravity. Unless specifically noted in this disclosure, the vertical direction is always perpendicular to horizontal.

Throughout this document references to "wire", "wires", "wired", or "wiring" may describe and/or show a single conductor when, in fact, two conductors may be required to power or control a subsystem; a convention used herein is to not show the common return conductor to which all electrical subsystems are connected—this common return conductor is a continuous electrical path and does not pass through any type of switch or other electrical component other than the possibility of passing through one or more connectors.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A rotating charcoal grill comprising:
a base, a charcoal bowl, a cooking grate, a support shaft, a grate coupler, and a spring;
wherein the rotating charcoal grill is a grill for cooking food over charcoal;
wherein the support shaft supports the charcoal bowl at a first height above the base;
wherein a motor located in the base causes a motor shaft to rotate;
wherein a height adjustment pin on the motor shaft causes rotation of the support shaft and the charcoal bowl when the motor shaft rotates;
wherein the motor shaft supports the cooking grate at a second height above the base where the second height is larger than the first height;
wherein the grate coupler rotationally couples the cooking grate to the top of the motor shaft such that the cooking grate is free to rotate atop the motor shaft;
wherein the difference between the first height and the second height is adjustable such that the cooking grate is brought closer to or farther away from the charcoal bowl;
wherein an operator panel controls the operation of the motor;
wherein the operator panel comprises a plurality of controls;
wherein the plurality of controls comprise a high speed control, a medium speed control, and a low speed control;
wherein when the high speed control is activated, the motor shaft rotates at the maximum possible speed of rotation;
wherein when the low speed control is activated, the motor shaft rotates at the minimum possible speed of rotation;
wherein when the medium speed control is activated, the motor shaft rotates at a speed that is intermediate between the rotational speeds that are associated with the high speed control and the low speed control;
wherein the bottom of the base is placed upon a horizontal surface to support the rotating charcoal grill;
wherein the base comprises a battery housing and a motor housing;
wherein the battery housing covers one or more batteries and wiring;
wherein the one or more batteries comprise one or more energy-storage devices;
wherein the one or more batteries are a source of electrical energy to operate the motor;
wherein the one or more batteries are replaceable or rechargeable.

2. The rotating charcoal grill according to claim 1
wherein the motor housing covers the motor and the wiring;
wherein the motor converts electrical energy into mechanical energy;
wherein the motor causes movement of the motor shaft when electrical energy is applied to the motor;
wherein the electrical energy applied to the motor is controlled by an operator panel;
wherein the motor shaft extends vertically upward from the motor and through the top of the base.

3. The rotating charcoal grill according to claim 2
wherein the motor shaft comprises the height adjustment pin;
wherein the height adjustment pin is a horizontal protrusion of the motor shaft that is located at a midpoint of the motor shaft;
wherein the height adjustment pin engages with a height adjustment cutout in order to set the first height.

4. The rotating charcoal grill according to claim 3
wherein the plurality of controls comprise an on/off control;
wherein the on/off control applies or removes an electrical potential to the motor;
wherein the motor is energized when the on/off control is in an ON position and are de-energized when the on/off control is in an OFF position.

5. The rotating charcoal grill according to claim 4
wherein the plurality of controls comprise one or more speed controls;
wherein the one or more speed controls determine the voltage applied to the motor, amperage through the motor, or combinations thereof and thereby determine the rotational speed of the motor shaft.

6. The rotating charcoal grill according to claim 4
wherein the charcoal bowl is a container for the charcoal;
wherein the shape of the charcoal bowl is hemispherical;
wherein the top of the charcoal bowl is open to accept the charcoal;
wherein the bottom of the charcoal bowl is coupled to the top of the support shaft;
wherein the motor shaft passes through the bottom center of the charcoal bowl in order to reach the grate coupler.

7. The rotating charcoal grill according to claim 6
wherein the cooking grate is a grill that holds the food above the charcoal;
wherein the cooking grate comprises a circular rim and a plurality of transverse rods;
wherein the plurality of transverse rods are parallel to each other;
wherein the ends of the plurality of transverse rods are coupled to the circular rim where the ends of the plurality of transverse rods intersect the circular rim.

8. The rotating charcoal grill according to claim 7
wherein the support shaft is a vertically-oriented hollow cylinder that elevates the charcoal bowl;
wherein the bottom of the support shaft rests upon the spring;
wherein the motor shaft passes vertically through the center of the support shaft;
wherein the support shaft comprises the height adjustment cutout.

9. The rotating charcoal grill according to claim 8
wherein the height adjustment cutout engages with the height adjustment pin to establish the first height;
wherein the height adjustment cutout comprises a vertical slot and two or more adjustment notches;
wherein the vertical slot is a vertically-oriented aperture located on the side of the support shaft;
wherein the two or more adjustment notches are horizontally-oriented extensions of the vertical slot.

10. The rotating charcoal grill according to claim 9
wherein the height of the charcoal bowl is changed by moving the support shaft vertically while the height adjustment pin is within the vertical slot;
wherein the height of the charcoal bowl is fixed by rotating the support shaft such that the height adjustment pin engages with one of the two or more adjustment notches.

11. The rotating charcoal grill according to claim 10
wherein the grate coupler couples the cooking grate to the motor shaft such that the cooking grate is supported by the motor shaft while the cooking grate is free to rotate around the center of the cooking grate;
wherein the grate coupler comprises a bearing housing, a ball bearing, and a grate cover.

12. The rotating charcoal grill according to claim 11
wherein the bearing housing is an inverted flange that rides on the motor shaft and supports the cooking grate;
wherein a throat of the bearing housing covers the top of the motor shaft and the ball bearing;
wherein the bearing housing rotates within a horizontal plane around the motor shaft;
wherein the ball bearing reduces friction between the motor shaft and the bearing housing.

13. The rotating charcoal grill according to claim 12
wherein the plurality of transverse rods of the cooking grate are sandwiched between a lip of the bearing housing and the grate cover;
wherein a plurality of fasteners retain the grate cover to the bearing housing.

14. The rotating charcoal grill according to claim 13
wherein the spring is a coil spring that surrounds the motor shaft;
wherein the bottom of the spring rests upon and presses against the top of the base;
wherein the top of the spring presses against the bottom of the support shaft;
wherein absent restraint due to the height adjustment pin engaging with one of the two or more adjustment notches, the spring forces the support shaft upwards.

15. The rotating charcoal grill according to claim 14
wherein the charcoal bowl is raised or lowered by rotating the support shaft until the height adjustment pin aligns with the vertical slot, lifting or pushing down upon the support shaft, and rotating the support shaft to engage the height adjustment pin with one of the two or more adjustment notches;
wherein the spring assists in raising the charcoal bowl by pushing up on the support shaft.

16. The rotating charcoal grill according to claim 15
wherein the plurality of controls comprise a forward control and a reverse control;
wherein the forward control causes the motor shaft to rotate in a first direction when the motor is energized;
wherein the reverse control causes the motor shaft to rotate in a second direction when the motor is energized.

* * * * *